C. McLAUGHLIN.
DRAFT YOKE FOR OXEN AND CATTLE.
APPLICATION FILED JULY 6, 1918.
1,307,914.
Patented June 24, 1919.
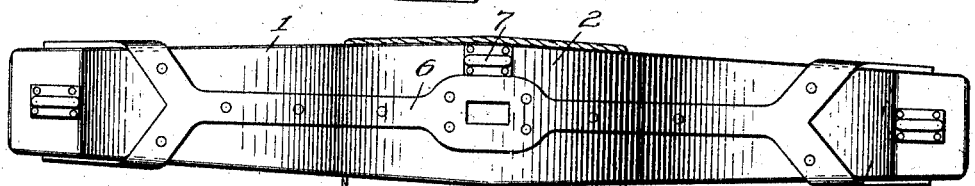
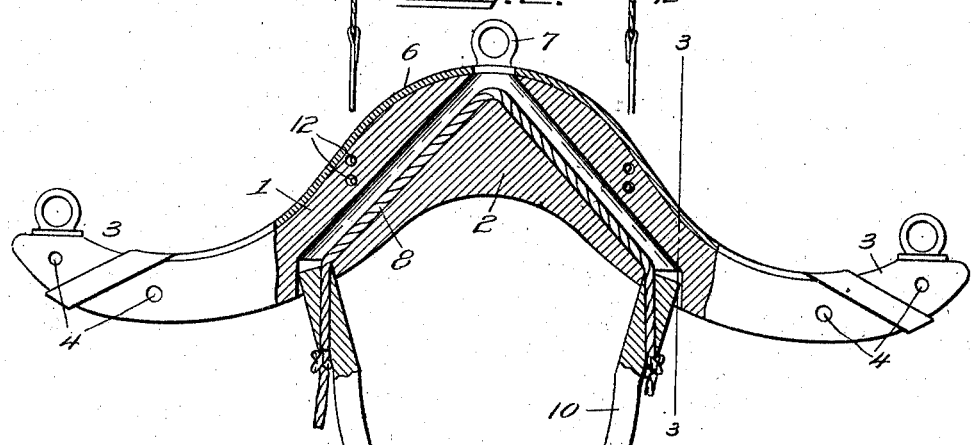
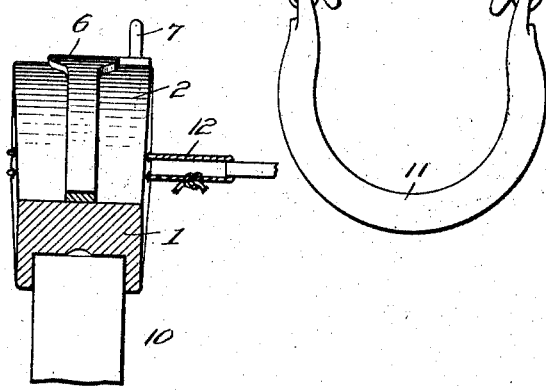
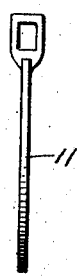
WITNESSES
F. C. Gibson.
I. C. Wilcox.
INVENTOR
Carolina McLaughlin
BY Victor J. Evans
ATTORNEY

UNITED STATES PATENT OFFICE.

CAROLINA McLAUGHLIN, OF ST. LOUIS, MISSOURI.

DRAFT-YOKE FOR OXEN AND CATTLE.

1,307,914.  Specification of Letters Patent.  Patented June 24, 1919.

Application filed July 6, 1918. Serial No. 243,645.

*To all whom it may concern:*

Be it known that I, CAROLINA MCLAUGHLIN, a citizen of the United States, residing at St. Louis, in the county of St. Louis City and State of Missouri, have invented new and useful Improvements in Draft-Yokes for Oxen and Cattle, of which the following is a specification.

This invention relates to draft yokes especially adapted to be used upon bovine cattle and it consists in the novel features hereinafter described and claimed.

An object of the invention is to provide a draft yoke of simple and durable structure adapted to be applied to the neck of the animal and used for all ordinary hauling purposes.

With this object in view the yoke includes a rigid member which is placed over the neck of the animal and in advance of the shoulders and which is provided with outstanding ends having openings through which the guiding reins or lines may pass. A cable is slidably mounted in the said member and hame plates are attached to the ends of the cable and adapted to bear against the shoulders of the animal. The lower portions of the hame plates are connected together by a rigid loop. Traces are connected with the member and may be connected at their rear ends with a swingle-tree or a draft appliance in a usual manner.

In the accompanying drawing:—

Figure 1 is a top plan view of the yoke.

Fig. 2 is a side view of the same with parts in section.

Fig. 3 is a transverse sectional view of the same cut on the line 3—3 of Fig. 2.

Fig. 4 is an edge view of the loop.

The yoke comprises a member 1, the body portion of which is made of wood. The said member is provided at a point between its ends with a bowed portion 2 which is adapted to rest upon the neck of the animal and in advance of the shoulders. The said member is provided with outstanding end portions 3. The portions 3 are provided in the vicinity of their outer ends with openings 4 through which the guiding lines or reins 5 may be passed. The said reins may be connected in any suitable manner at their forward ends with the bridle or halter of the animal. The member 1 is faced at one side with a plate 6 of metal which adds rigidity to the said member. The member 1 is provided at the intermediate part of the bowed portion 2 with an eye 7 in which may be secured the halter strap or rope.

A cable 8 is slidably mounted within the intermediate portion of the yoke 1. Hame plates 10 are connected with the ends of the cable 8 and extend below the lower edge of the yoke 1. These plates 10 are preferably made of wood and they are curved longitudinally in order to snugly fit against the shoulders of the animal. A loop 11 of metal is suitably connected with the lower end of one of the hame plates 10 and is adapted to be connected at its free end with an eye carried by the other hame plate whereby the said plates are held in position with relation to each other and the loop 11 is bowed downwardly in order that it may pass below the wind pipe of the animal without binding the same. Traces 12 are connected with the intermediate portion of the member 1 and may be connected in any suitable manner at their rear ends with a swingle tree or other draft appliance. The traces 12 are preferably in the form of round wire cable.

From the foregoing description taken in conjunction with the accompanying drawing it will be seen that a yoke of simple and durable structure is provided and that the same may be economically and conveniently used upon cattle for employing the same for drawing loads individually.

Having described the invention what is claimed is:—

1. A yoke comprising a member of rigid material having a bowed intermediate portion and outstanding end portions, a cable slidably mounted upon the yoke, hame plates connected with the cable, a loop of rigid material connecting the hame plates together, and traces attached to the member.

2. A yoke comprising a member of rigid material having an intermediate bowed portion, a cable movably mounted upon the bowed portion of the member, hame plates connected with the cable, a loop of rigid material adapted to connect the hame plates together and traces attached to the member.

3. A yoke comprising a member of rigid material having an intermediate bowed portion and outstanding end portions provided with openings, a plate applied to the member and serving as a brace for the same, a cable slidably mounted upon the said member, hame plates connected with the cable, a loop of rigid material adapted to connect the hame plates together and traces attached to the member.

In testimony whereof I affix my signature.

CAROLINA McLAUGHLIN.

Copies of this patent may be obtained for five cents each, by addressing the "Commissioner of Patents, Washington, D. C."